No. 708,104. Patented Sept. 2, 1902.
H. H. WARNER.
FLEXIBLE PIPE JOINT.
(Application filed Nov. 7, 1901.)
(No Model.)
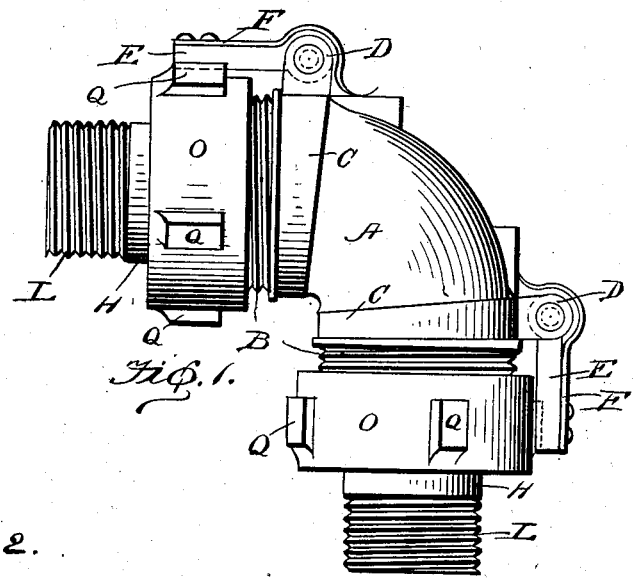
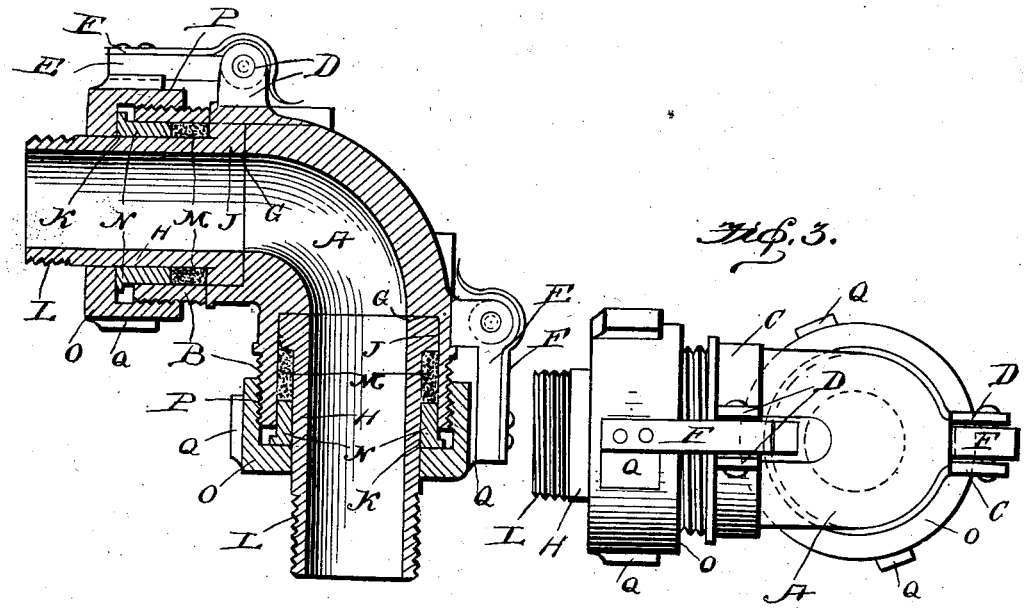
Witnesses
Bernard M. Offutt
Andrew S. Cassell
Inventor
Henry Hubbard Warner
by Roadhouse & Moore
Attorneys

UNITED STATES PATENT OFFICE.

HENRY H. WARNER, OF TACOMA, WASHINGTON.

FLEXIBLE PIPE-JOINT.

SPECIFICATION forming part of Letters Patent No. 708,104, dated September 2, 1902.

Application filed November 7, 1901. Serial No. 81,427. (No model.)

*To all whom it may concern:*

Be it known that I, HENRY HUBBARD WARNER, a citizen of the United States, residing at Tacoma, in the county of Pierce and State of Washington, have invented certain new and useful Improvements in Flexible Pipe-Joints, of which the following is a specification.

My invention relates to improvements in flexible pipe-joints; and the main object of my invention is the provision of a joint for steam, air, and liquid pipe connections which are especially adapted for railway-car purposes.

Another object of my invention is the provision of a simple, durable, and inexpensive joint which is thoroughly efficient and practical.

To this end the invention consists of a pipe-joint embodying novel features of construction and combination of parts, substantially as disclosed herein.

In the drawings, Figure 1 is a side elevation of my flexible joint. Fig. 2 is a sectional view thereof, and Fig. 3 is a top plan view thereof.

Referring to the drawings, A designates the curved section or pipe, provided with the threaded ends B and the yokes C. These yokes are each provided with the lugs D, to which are pivoted the dogs or detents E, which are normally held at right angles to the yoke and the ends of the pipe by means of the flat spring F. Fitting in the shouldered mouth G of the pipe is the short pipe or coupling H, which is provided with the shouldered end J, the smooth surface K, and the threaded outer end L. Surrounding this coupling upon the smooth surface K, flush against and the same thickness as the shoulder J, is an asbestos gasket M, and also surrounding this surface and the same thickness as and contacting the asbestos gasket is a hard-rubber gasket N, which ordinarily projects beyond the end of the pipe A. Fitting and slidingly mounted upon this coupling is the shell or disk O, provided with the interiorly-threaded part P, which engages the threaded ends of the pipe A and compresses the rubber and asbestos gaskets so as to make a swiveling yet steam, air, or liquid tight joint. To prevent the same—that is, the disk—from becoming loose, I provide the lugs or ears Q upon the outside of the flange, so that the dog can engage the same and hold the disk against movement. From this construction—that is, by employing the asbestos gasket—I devise an article which is easily revoluble, as the asbestos does not make a too tight joint, as would be the case if a rubber gasket were used instead, and thereby does not bind the joint.

From the foregoing, taken in connection with the drawings, it is evident that I provide a very simple, durable, and cheap flexible joint for steam, air, and liquid pipes and one which by reason of its few parts and easy assemblage is thoroughly efficient and practical.

What I claim is—

A swivel flexible joint connection for pipes, comprising a pipe provided with a threaded end, a short coupling rotatably mounted in the end of said pipe and having a shouldered inner end, a smooth intermediate surface and a threaded outer end, a heat-non-conducting gasket surrounding the smooth surface next to the shouldered end, a hard-rubber gasket having an annular rim surrounding the smooth surface of the coupling and having the rim beyond the threaded end of the pipe, a flanged disk mounted upon the smooth portion and adapted to engage the threaded end of the pipe and compress the gaskets, a series of lugs formed on the extension of the disk, a yoke surrounding the pipes, a pair of lugs carried by the yoke, a detent pivotally mounted between the lugs, and a flat spring connected to the detent and having its free end abutting against the exterior of the pipe to normally hold the detent in engagement with one lug of the flanged disk.

In testimony whereof I affix my signature in presence of two witnesses.

HENRY H. WARNER.

Witnesses:
RUPERT SCHULTHEISS,
FRANK D. WARNER.